United States Patent
Rao et al.

(10) Patent No.: US 8,863,649 B1
(45) Date of Patent: Oct. 21, 2014

(54) INTELLIGENT BEVERAGE AND CULINARY APPLIANCES

(75) Inventors: Raman K. Rao, Palo Alto, CA (US); Rekha K. Rao, Palo Alto, CA (US); Sunil K. Rao, Palo Alto, CA (US); Sanjay K. Rao, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 822 days.

(21) Appl. No.: 11/086,810

(22) Filed: Mar. 21, 2005

(51) Int. Cl.
    *A47J 31/00* (2006.01)

(52) U.S. Cl.
    USPC .................. 99/283; 99/282; 99/280; 99/295; 700/15; 700/65; 700/83

(58) Field of Classification Search
    USPC ........ 99/280, 281, 282, 283, 295; 700/12, 15, 700/65, 83; 340/534, 538
    See application file for complete search history.

(56) References Cited

U.S. PATENT DOCUMENTS

| | | | |
|---|---|---|---|
| 6,587,739 B1 * | 7/2003 | Abrams et al. | 700/83 |
| 6,729,226 B2 * | 5/2004 | Mangiapane | 99/291 |
| 6,786,134 B2 * | 9/2004 | Green | 99/289 P |
| 7,060,953 B2 * | 6/2006 | Ishikawa et al. | 219/702 |
| 7,151,968 B2 * | 12/2006 | Williamson | 700/65 |
| 7,223,427 B2 * | 5/2007 | Knepler | 426/231 |
| 7,455,867 B1 * | 11/2008 | Gutwein et al. | 426/594 |
| 7,762,181 B2 * | 7/2010 | Boland et al. | 99/322 |

* cited by examiner

*Primary Examiner* — Reginald L Alexander
(74) *Attorney, Agent, or Firm* — Levine Bagade Han LLP

(57) ABSTRACT

A networking system, method and apparatus for real time management, operation, command and control of various intelligent beverage appliances and intelligent culinary appliances enabled for the preparation, storage and serving/dispensing of hot and cold beverages and food items. The intelligent beverage appliances and intelligent culinary appliances enabled for personalized/customized preparation, storage and dispensing of selected beverage/food items in accordance with user/customer preference profiles maintained within said intelligent appliances and or in conjunction with a central server, a mobile device, a stationary device or a combination thereof; including the maintenance of user/customer information in secure databases for evaluation and analysis by the customer, vendor and an authorized health care professional for personal health management and other utility.

59 Claims, 1 Drawing Sheet

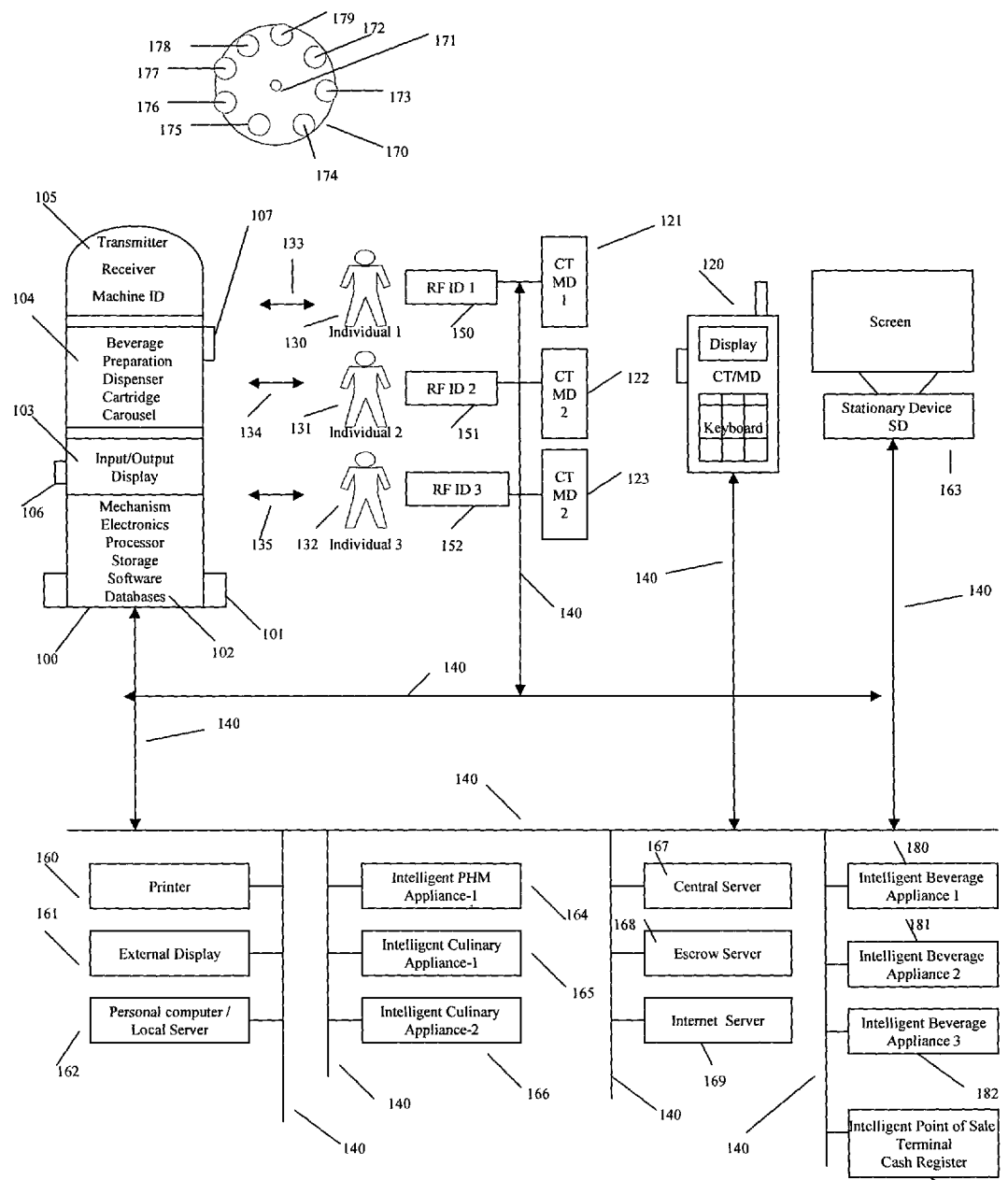

US 8,863,649 B1

INTELLIGENT BEVERAGE AND CULINARY APPLIANCES

ABBREVIATIONS

Cellular Telephone is abbreviated as CT
Mobile Device is abbreviated as MD
Stationary Device is abbreviated as SD
Intelligent Personal Health Management Appliance is abbreviated as IPHMA
Personal Health Management is abbreviated as PHM
The terms Appliance, Device and Machine are used interchangeably.
The terms gastronomic and culinary are used interchangeably.
Intelligent Culinary Appliance is abbreviated as ICA.
Intelligent Beverage Appliances is abbreviated as IBA.

BACKGROUND OF THE INVENTION

The present invention addresses the need for a new class of intelligent appliances, referred to in here as intelligent culinary appliances and intelligent beverage appliances for the storage, preparation and dispensing of hot and cold foods and beverages that enable personalization/customization to suit the taste and health needs of the individual whether he/she is at home, in the office, or at a store that sells such hot and cold foods/beverages including large specialty fast food chains that are ubiquitous at each corner of the street or at other locations; for enabling the individual to partake of a hot or cold items of food and beverages in accordance with his/her taste preferences and personal health management criteria. The present invention is also applicable for the preparation, storage and dispensation of generic and standard food/beverage items that are not either personalized or customized. The present invention enables the tracking of the consumption of various food/beverage items wherever and whenever they are consumed to provide a comprehensive gastronomic/culinary consumption profile of the individual for one or more uses including personal health management.

SUMMARY OF THE INVENTION

Currently, customers generally drink coffee, tea, hot chocolate, milk and other drinks hot; and various drinks such as lemonade, iced tea, iced coffee, fruit juices, colas and others drinks cold.
It is generally well accepted fact that drinks such as coffee/tea/hot chocolate are best served freshly brewed for acceptable taste and quality. Connoisseurs can very easily discern the subtle difference in taste as a function of the specific ingredients used and time duration from the time the beverage was first brewed; as the taste degrades as the time from the first time the beverage was brewed increases.
In addition, different individuals have different tastes and a single pot of the coffee or any beverage prepared in bulk is not likely to satisfy any two individuals equally, especially a husband and wife as they start out the day in the morning or at any time during the day. The marital discord over a simple cup of coffee is rather disconcerting and fortunately this problem is being addressed and solved by various manufacturers who are introducing hot beverage machines/appliances that enable an individual to prepare a single serving of the beverage using single packages/pods are other descriptors that enable a single shot beverage to be prepared and dispensed by a so called automatic coffee maker/hot beverage maker.

The automation in these hot beverage machines/appliances is of limited value as the pods/packages have to be manually inserted each time and the programmability of the machines and their communication capabilities is also limited in other ways providing unsatisfactory utility for comprehensive and real time tracking of consumption and personal health management.

In addition, these appliances of the prior art do not have remote communication, command and control features by wired or wireless means. Nor do the beverage machines, of the prior art have the ability to maintain a state for each individual, such as through a individual's personal profile in the electronics or software of the machine nor do they have the ability to track the usage/consumption patterns of the individual in accordance with the user's health sensitivities and other personal health management factors in a database or in other ways.

In addition, it has been reported that the beneficial health effects of beverages such as coffee is best realized within a short time such as less than 10 minutes after initial brewing; and beverages such coffee that are continually heated and consumed after 30 minutes or more have certain negative health effects. Consequently, the initiation, preparation, and consumption of certain beverages have a time dependency.

Therefore, there is a need for time sensitive command and control features to be incorporated into the appliances for proximate [near the machine/appliance interaction with an individual] command and control or for command and control from a remote location such as over the telephone including a cellular telephone/mobile device by wired or wireless means; and for command and control over a wired or wireless network comprising of a central server such as a personal computer, a stationary/mobile device, a local server and an Internet server.

The present invention enables these and other enumerated features in the new class of intelligent beverage appliances, IBA. In addition, the present invention enables the individual to regulate the ingestion/consumption of such hot and cold beverages in accordance with personalized pre set rules with the objective of better personal health management; as the excessive consumption of certain beverages such as coffee leads to negative health effects such as being wired and jumpy, palpitation of the heart; and in the case of beverages such as colas that contain excessive amounts of sugars and acids such as phosphoric acid, the contributions to conditions such as tooth decay, diabetes and obesity.

The consumption of hot and cold beverages therefore is not an act that should be taken lightly by the individual, but it is an act that must be managed by the individual to derive the benefits from limited and responsible consumption of said beverages while at the same time limiting the negative effects resulting from unmanaged consumption by either adults and more importantly by children. The present invention enables such proactive management of the consumption of beverages in conjunction with a new class of intelligent culinary appliances, ICA and intelligent beverage appliances, IBA.

The present invention enables mobile devices such as cellular telephones, PDAs, laptop computers and other devices to perform the additional functions of command and control of the intelligent beverage appliance, IBA, including the ability to store information such as individual beverage preferences, consumption patterns and tracking of consumption of individual beverage items.

These intelligent beverage appliances are configured with preparation, dispensing and electronic processing capabilities; and additionally may include command, control, compute and wired or wireless communication capabilities with a central server and or a mobile device/stationary device such as a personal computer, cellular telephone, PDA, lap top computer and other devices including various servers in a local network or across the Internet.

The present invention teaches novel methods and appliances for preparation and consumption of hot and cold beverages for individual use at home or for industrial utility such in fast food outlets, restaurants and offices that enable command and control via a mobile device such as a cellular telephone/other mobile devices including personal digital assistants, lap top computers and stationary devices by wired or wireless means further enabling the personal health management by him/her self or in conjunction with a trained health care professional.

The present invention additionally teaches the automatic recognition of an individual for the placement of a beverage/food order in a beverage/food outlet by means of a mobile device including a cellular telephone/RF ID Tag associated with the individual and for the automatic preparation, delivery and payment of the beverage order according to the personal preferences of the user. Similarly, the user is enabled via a cellular telephone/mobile device/stationary device to initiate and completed the preparation and delivery of the selected beverage.

The present invention similarly addresses a new class of intelligent culinary appliances for the preparation, storage and dispensing of various hot and cold food items in a personalized and customized manner for use by individuals in the home, office, industrial and mass retail applications.

The present invention describes a novel architecture for networking of various intelligent culinary appliances, intelligent beverage appliances [including fruit drinks, colas, wines, coffee, tea, milk, soups and other hot and cold drinks], intelligent personal health management appliances, mobile devices, personal computers, intelligent point of sale terminals, cash registers and servers by wired or wireless communication means.

Various important objectives of the present invention are enumerated in detail below. Other objectives may become apparent to those knowledgeable in the art and the invention is not to be construed as limited to the specific objectives enumerated herein:

1. An objective of the present invention is an intelligent hot and or cold beverage appliance for the preparation, storage and dispensing of hot/cold beverages in accordance with the user's preference profiles maintained within the intelligent beverage appliance, within a server, within a mobile, within a stationary device or a combination thereof. The intelligent beverage appliance is referred in here in abbreviated form as IBA.
2. An objective of the present invention is an intelligent culinary [hot and or cold food] appliance for the preparation, storage and dispensing of hot/cold foods in accordance with the user's preference profiles maintained within the intelligent culinary appliance, within a server, within a mobile, within a stationary device or a combination thereof. The intelligent culinary appliance is referred in here in abbreviated form as ICA.
3. An objective of the present invention is to enable the intelligent beverage appliance/intelligent culinary appliance to be uniquely identifiable by one or more means including a unique IP [Internet Protocol] address, a RF ID tag [Radio Frequency Identification] and other identification means; for the purpose of wired or wireless communication.
4. An objective of the present invention is an intelligent beverage appliance/intelligent culinary appliance enabled for command and control of its various functions by human interface/interaction means that includes various types of inputs and outputs comprising of key stroke, touch screen, voice, icon, customized icons, audible sounds and other means that provide ease and enhanced utility to the user/customer.
5. An objective of the present invention is to enable command and control of the intelligent beverage appliance/intelligent culinary appliance by manual and or automatic means via direct human interaction or via a separate device such as a mobile device [including cellular telephones, PDAs, laptop computers and other devices], stationary device, servers and other intelligent appliances.
6. An objective of the present invention is to enable the IBA/ICA with built-in processing, media storage, software, database and other capabilities for stand alone operation or operation in conjunction with the processing, storage and software capabilities of a remote mobile/stationary device, one or more servers including a central server or a combination thereof.
7. An objective of the present invention is to enable the IBA/ICA with the capabilities for customized/personalized selection, processing, preparation, storage and dispensing/serving capabilities such as with individualized packages/pods that contain a selected ingredient [such as selected types of coffee or tea]; wherein the individual packages/pods are stored within or external of the IBA/ICA and made available on demand for the preparation of the selected beverage/food item in accordance with the user's selections and user's profile at the selected time and in the selected sequence.
8. An objective of the present invention is a carousel including a stack of carousels that enable the storage, staging and delivery of the selected ingredient, package/pod to the IBA/ICA for the selected preparation of the desired beverage/food item at the desired time; including for large volume applications such as in mass market retail/industrial establishments.
9. An objective of the present invention is to enable the IBA/ICA to be commanded and controlled for ordering, preparation, delivery and payment of the selected beverage/food item by the user/customer in a vendor establishment by a mobile device, a stationary device and other devices proximately within the store or remotely across a network by wired or wireless communication means; including in conjunction with an intelligent point of sale terminal for payment of goods and services received by the customer.
10. An objective of the present invention is to enable the user/customer to track, monitor and obtain selected information related to the specific beverage/food items consumed, the times at which the items were consumed and other information such that the user is enabled to evaluate, analyze and correlate the information for the purpose of personal cost and health management by him/her self or in conjunction with others such as health care professionals.
11. An objective of the present invention is to enable the vendor to track various customers and their preferences/consumption patterns for various purposes such promotions, new product testing, market studies, peak business determination, trends and for other purposes that are of utility to the vendor, customer, regulatory authorities or a combination thereof.
12. An objective of the present invention is to enable the customer/user to be uniquely recognized by one or more means such as a customer profile including a photo and other information maintained within the individual's RF ID Tag/smart RFID card or his/her mobile device.

Other objects, features and advantages of the present invention will become apparent from the following detailed description when taken in conjunction with the accompanying drawings.

BRIEF DESCRIPTION OF THE EMBODIMENTS OF THE INVENTION

The accompanying drawings, which are incorporated in and form a part of this specification, illustrate embodiments of the invention and, together with the description, serve to explain the principles of the invention:

FIG. 1 shows architecture for networking and for operation of various intelligent beverage appliances, intelligent culinary appliances in a standalone manner and or in conjunction with point of sale terminals [POS], mobile/stationary devices and servers.

The FIGURE also shows the functioning of an intelligent beverage preparation and beverage storage/dispensing appliance. By extension, the FIGURE is intended to show the functioning of an intelligent culinary appliance.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

For example, the embodiments that follow relate to a networking architecture, a system and apparatus for enabling intelligent beverage appliances IBA/intelligent culinary appliances ICA, in conjunction with different other devices/appliances such as intelligent appliances that are mobile and or wireless, but are intended to include stationary units as well; and devices such as personal computers (PCs) and stationary intelligent and non intelligent appliances; wherein as an illustration a non intelligent appliance is enabled with an external wireless capability and external networking capability by means of attachments and other methods.

Further, the communication with/from an intelligent beverage appliance/intelligent culinary appliance, including a preparation, storage, dispensing and health management inquiry or request can be in any form of intelligence, such as key entries from a keyboard, voice in any language, graphics such as a key click on a graphic page, mouse clicks on a view, or even tactile responses or depressions of a foot pedal. Required translations, such as from one language to another or from a tactile entry to a voice command, are made automatically.

As another example, the IBA/ICA is enabled in conjunction with one or more types of information including gastronomic information, one or more personal and/or common databases, storage, processors and software resident on one or more devices/servers located within the device itself, a local server, a central server, a network server or located across a network including the Internet. The architecture system and apparatus may have other applications, for example in a hospital/institutional/professional environment, and the embodiments described herein are for illustrative purposes and are not to be construed as limiting the present invention.

The present invention is an IBA/ICA apparatus and management system comprising of various types of intelligent beverage/intelligent culinary appliances that are designed and used for specific personal beverage/food preparation, storage, ordering, dispensation and health management applications. The intelligent IBA/ICA appliances are used in a standalone manner or in conjunction with various gastronomic inquiry and information systems, since the health of an individual generally pivots around the ingestion of beverages/food, ingestion of other substances, physical activities and mental activities.

The IBA/ICA appliance is configured for the real time acquisition of various data related to the individual, storing the acquired data within said appliance and or on a central server, displaying the selected information on said device or another display device, making an information inquiry including preparation methods, inventory of ingredients, dispensation, delivery, payment, health factors and gastronomic factors to an information server having a personal customer/user preference profile and a related health and gastronomic database. The present invention includes displaying [image and data] a response to the inquiry related to preparation, storage, inventory, dispensation, personal health and gastronomic information from the information server/central server on the selected display device including the intelligent IBA/ICA.

The present invention also includes sending an inquiry from the IBA/ICA appliance/display device to the information server, preparing the selected response to said inquiry on the information server, and receiving the response to the inquiry from the information server with an IBA/ICA and other devices that include a cellular telephone/a mobile device/stationary device.

A preferred embodiment includes formatting the response to the selected inquiry on the display device, efficiently searching for the relevant information, efficiently accessing and acquiring one or more types of information and displaying the formatted response to the inquiry on the display device and storing/retrieving said information on one or more databases located on the intelligent appliance itself [such as the IBA/ICA], on a mobile device such as a cellular telephone, personal digital assistant, lap top computer, other mobile devices, stationary devices and one or more servers such a local server, a central server, a network server and a escrow server.

The escrow server and or other servers securely stores personal preferences, user/customer profiles, health and other information and provides access to the selected information to selected/permitted individuals/entities at the selected times using permission schemes and authentication schemes as defined by the individual. The escrow server further provides that the underlying permission/authentication schemes are not generally made available; and are efficiently executed by the escrow server without revealing or compromising sensitive personal information.

In the present invention a user selecting an action to be performed by the IBA/ICA/a mobile device or a stationary device connects to a central server and other intelligent culinary appliances, intelligent beverage appliances, point of sale terminals, intelligent personal health management appliances of the present invention by wired or wireless means. The central server receives the request for the action, and parses the necessary information to service the information/action request. Reference to the central server is intended to include one or more other servers such a local server, a network server and an escrow server. Any information may be parsed, but will normally include identification (ID) of the user, specific identification information related to the IBA/ICA appliance, the servers and other devices; information about the selected input/output formats selected, communication protocols selected, language, the basis or type of the action, the number of actions desired, and any parameters that may be pertinent.

The parameters involved may include, for example, inputting a limit on the values for a comparison/action, such as a limit on a selected beverage/culinary related action by itself or in relation/conjunction with other parameters including health/gastronomic parameters.

Another preferred embodiment of the present invention includes a mobile device such as a cellular telephone, personal digital assistant, lap top computer and other mobile devices for enabling the control of one or more IBA/ICA appliances and servers, for initiating a selected query/action using the user preferred input/output methods, displaying a response to the inquiry from the information server/other intelligent appliances on the display device/mobile device/stationary device.

The preferred embodiment includes sending the inquiry from the display device/mobile device to the information server. The preferred embodiment also includes preparing a response to the inquiry on the information server. The mobile device is used for receiving the response to the selected inquiry from the information server with the display device/mobile device. The preferred embodiment includes formatting the response to the personal health management/personal visualization inquiry on the display device/mobile device/personal health management appliance/IBA/ICA, and displaying the formatted response to the selected inquiry on the display device/mobile device/intelligent personal health management appliance/IBA/ICA.

The novel embodiments and teachings of the present invention will be made clear in conjunction with the figures and the descriptions:

Referring now to FIG. 1 in detail, this single FIGURE is structured to illustrate a number of distinct and related applications that include at home use, use in an office environment, a mass retail environment and other environments, especially illustrating various types of intelligent beverage appliances/machines and various types of intelligent culinary appliances:

The intelligent appliance specifically illustrated is an intelligent beverage appliance 100, comprising of an appliance with a housing and a base 101; a functional block 102 comprising of the mechanism for various operations, electronics, processor, storage, software and databases; a functional block 103 comprising of input/output and display; a functional block 104 comprising of beverage preparation, dispenser, cartridge/carousel or other means for holding various types of beverage packages such as individual pods, packages or other forms containing various beverages; a functional block 106 for various auxiliary inputs/output jacks, a dispenser spout or other outlets represented by 107 and a functional block 105 comprising of a transmitter/receiver/other means for wired or wireless communications and a means for uniquely identifying the intelligent beverage appliance 100 by RF ID Tag, mobile IP, static IP or other appliance identification means. The intelligent appliance 100 is intended for hot/cold beverages and is configured appropriately by providing the selected configuration in the mechanism block 102 and other functional blocks appropriate for the selected application.

By analogy, the representation of the intelligent beverage appliance 100 is extensible to an intelligent culinary appliance performing the functions of hot/cold food preparation, storage and dispensing.

One or more individuals are enabled to utilize the intelligent appliance 100 in a generic manner or in a personalized/customized manner for a desired beverage/culinary application. Individual 1 represented by 130 is enabled for manual/automatic command and control by the communication path 133; and similarly individual 2, 131 uses command and control path 134; and individual 3, 132 uses the command and control path 135. Individuals may have specific identification and user/customer profiles for uniquely addressing/using the intelligent appliance 100.

Alternately, in another novel embodiment of the present invention, the individual may be identified by a wearable/embedded identification, such as a radio frequency tag, RF ID Tag, which uniquely identifies the individual 130, 131 and 132 and their respective RFID Tags 150, 151 and 152. The RF ID Tag is designed to maintain certain user selected information and is enabled for read only and or read and write functions thus enabling real time data to be included in the respective RF ID Tags. Hence, the RFID tag is enabled for wireless access by one or more appliances, stationary, mobile devices and servers by the wired or wireless communication path 140.

Alternately in another novel embodiment, the individual 1, 2 and 3 and so on may be associated with their own cellular telephones CT/mobile devices MD wherein the CT/MD has a unique identifying number for addressing and communication with the intelligent appliances 100 and other by wired or wireless communication path 140. The individual is enabled for command and control of the intelligent appliance 100 and other devices in conjunction with their associated mobile device 121, 122 and 123 and stationary devices. A generic mobile device [including a cellular telephone, PDA, lap top computer and other forms is represented as 120 in detail and a stationary device is represented in generic form as 163 for illustrative purposes with each being able to communicated by one or more wired and or wireless communication paths 140.

In another novel embodiment of the present invention, the intelligent appliance 100, the RFID Tags 150, 151, and 152; the mobile devices 121, 122 and 123; the mobile device 120 and stationary device 163 are part of a flexible wired or wireless local or large area network including the Internet. The network is designed to comprises of selected and useful devices and nodes such as a external printer 160, an external display 161, a personal computer/local server 162, one or more intelligent personal health management appliance 164, one or more intelligent culinary appliance 165, 166 [such as an intelligent bagel toaster], one or more other intelligent beverage appliances 180, 181 and 183; a point of sale terminal/cash register 183 [in retail applications]; and a central server 167, an escrow server 168, and an Internet server 169; wherein said devices communicating on one or more channels of wired or wireless communication by communication path 140, said communication protocols being appropriate for a selected communication with a selected device. Once again the comprehensive stationary devices/mobile devices/appliances/servers are shown for illustration purposes and the actual configuration may depend on the specific application and the illustration is not to be construed as limiting in any manner.

The intelligent beverage machine/appliance 100 may utilize different types of ingredient packages for manual or automatic application. Similarly, by analogy the same is applicable for the intelligent culinary appliance. One type of ingredient input/handling mechanism for multiple packages/pods is shown as 170; comprising of a carousel arrangement on which a number of packages/pods are loaded/pre-loaded. The packages/pods such as for coffee/tea may be all same or different. The individual packages/pods are shown as 171, 172, 173, 174, 175, 176, 177, 178, and 179. The number of packages/pods that could be fitted on a single carousel depends on the carousel size. The carousel is shown as circular but any geometry is possible.

A number of carousels may be stacked to form a magazine wherein each carousel is same or different. Other types of organizations for storing and retrieving individual packages/pods are possible and the illustration is not to be construed as limiting. The carousels can ride on a spindle and may rotate around a vertical axis such that when the carousel turns an individual package/pod is dispensed for individual brewing/preparation and subsequent dispensation of a measured quantity of the selected beverage/food item that is hot/cold.

The specific applications of the intelligent beverage appliance 100 and by extension the intelligent culinary appliance are illustrated with examples below:

Example 1

Intelligent Beverage Appliance, IBA for the Preparation, Storage and Dispensation of Hot Beverages Such as Coffee, Tea, Hot Chocolate and Other Hot Beverages in the Home/Office Environment/Retail Environment For personal home/office use, the individual 1, 130 is enabled to maintain a personalized user profile within the intelligent beverage appliance 100 by means of various selected input methods that include key stroke, touch screen, voice, text, data and other types of inputs such as selected icons and languages. The I/O capabilities and display available on the IBA is used for said inputs and outputs. Similarly, the individual 1, 130 is enabled to select the desired output formats such as text in a selected language, voice in a selected language and other selected formats. Similarly, other members of the family such as in household/home are enabled to maintain their own personal profiles within the machine. In an office environment, selected individuals are enabled to maintain their own profiles within the machine. As an example, a member of the family may select an icon that shows up on the machine such that activating, such as by touch means, activates the programmed preparation, storage and dispensing sequence related to the selected first individual's preference profile. Similarly multiple individuals are enabled to maintain their personal beverage profile. The beverage profile will normally consist of various parameters such as the type of ingredients to be used [such as the type of coffee, tea, chocolate and so on and the specific packages/pods to be used], the types of other ingredients, and the preparation techniques and delivery/dispensation requirements.

The individual is enabled to interact and command the IBA/ICA by manual means such as by voice command or by key stroke, touch screen and so on. Further, the individual is enabled to view the status and other information on a display and or hear it by sound/including by audible means.

In another alternate novel embodiment the individual is enabled to command and control the IBA/ICA by remote means by wired or wireless communication from a mobile device/stationary device. The command and control is enabled by voice, key stroke and other means. The remote mobile device/stationary device is enabled for initiation, preparation, storage [staging] and dispensation/serving in accordance with the customer/user profile maintained within the IBA/ICA.

In another novel embodiment of the present invention, the user/customer is enabled to maintain a personal beverage/food profile within a RFID Tag, a mobile device, within a stationary device and one or more servers including a personal computer in a home network, in a server; and in one or more locations such the server belonging to the selected vendor. The customer/user is enabled to activate, command and control the IBA/ICA to perform the selected beverage/food actions in accordance with the user/customer selected actions/user profiles stored within the IBA/ICA or the profiles stored within the mobile device/stationary device, various servers or a combination of the servers, intelligent appliances and mobile/stationary devices.

The RF ID Tag is used to enable the communication of user profiles and other information across the network for automatic recognition of the individual at home, office, mass retail or other locations. The RFID Tag may be in the form of a smart card that is readily recognized by one or more intelligent appliances, mobile/stationary devices, point of sale terminals and servers. The RF ID Tag could be in other forms such in wearable forms.

In another embodiment of the present invention, the databases including the general and user specific databases located within the IBA/ICA or other intelligent appliances/mobile devices/stationary devices and servers are automatically updated or updated upon command by the vendor/customer to provide the user/customer and also the vendor [as appropriate] comprehensive information related to the beverage/food choices of the individual.

The IBA/ICA is also enabled for command, control and synchronized actions in conjunction with other intelligent appliances such as an intelligent alarm clock. The user is enabled to link the alarm clock with the IBA/ICA for synchronized actions or the selected actions in conjunction with the user selected preferences. Alternately, the IBA/ICA is itself programmable for initiating an action such as preparation of coffee in the morning in accordance with the user selected/set preferences by wired or wireless means at the IBA/ICA level or from a remote appliance such as a mobile device [cellular telephone, PDA and others] or in conjunction with a server and other intelligent appliances such as an intelligent alarm clock.

Example 2

Automation with the Cartridges, Carousels and Other Storage, Insertion Mechanisms The prior art requires that the user manually pour water, coffee and filters in a so called automatic coffee/beverage machine. However, this is often inconvenient. There is a need for loading the selected ingredients in the selected proportions automatically and further having the machine prepare the coffee in accordance with the user's personalized specifications. Various mechanisms may be enabled in the present invention to automatically load the required ingredients in accordance with the personalized requirements.

In the present invention, one method for staging, selecting and loading the required ingredients in a selected manner is in conjunction with the carousel 170. Other methods of selecting, loading and staging are possible and the present invention is not to be construed as limiting due to this particular illustration. The user is enabled to load/pre-load the carousel with various ingredients such as coffee packets/pods, tea packets/pods, soup packets/pods for the purpose of individualized preparation, brewing and serving at the selected time of the selected flavor or selected ingredient in the selected manner. With this arrangement the individual may select a particular type of coffee from a large selection of coffees of different types that are preloaded or loaded on a selected carousel. Or alternately, the selected carousel may contain the same package/pod for multiple individualized uses at the selected time.

Utilizing either a manual selection method, using the input/output of the IBA/ICA or a remote access such as from a cellular telephone, a mobile device, a stationary device, a remote controller [including a universal remote controller or an intelligent keyboard device] the individual is enabled to select the particular and specific type of material such as a particular type of coffee and have the coffee prepared according to the user's profile stored in the IBA/ICA or according to the user's profile stored in a mobile device/stationary device and a server. Dynamic changes to the user's profile are enabled on the IBA/ICA itself or from an external device such as a mobile device/other devices for real time control and communication of the user's beverage/food preferences and other settings. The carousel spins around a vertical axis and is positioned such that the selected package/pod is delivered/inserted into the brewing/food preparation slot of the IBA/ICA for a selected preparation.

Multiple individuals may each have their own personalized preferences for a beverage/food and have the selected item prepared/brewed and delivered/dispensed in the manner selected by them including by automatic means as per their user/customer profile and the information stored in one or more places for detailed evaluation/analysis including in conjunction with a health care professional. Thus many members in a family household and or in an office environment are enabled for command and control in a proximate manner or for command and control of the IBA/ICA via a remote device such as a cellular telephone or other mobile devices; with their appropriate data communicated to the relevant databases and devices.

By extension specific references to coffee and other beverages are not meant to be limiting but are used for illustrative purposes. Consequently, by extension, the present invention is applicable to various food preparation, food storage and food dispensations/serving applications.

Example 3

Mass Retail Applications in Fast Food and Other Restaurants Such as Mass Beverage Outlets Fast food and large beverage outlets such as major coffee outlets see the peak demand in the morning and at other selected/well determined times of the day. At this time the lines of customers tend to be long and the customers are generally in a hurry to get to their office. The number of service personnel employed by the food/beverage outlet, are often times the limiting factor in providing faster service; and additionally the equipment used by these establishments is generally manual/manpower intensive. Therefore there is a need for automation of the preparation and delivery methods. Another limiting factor is the individual requirements of each customer even if the menu items are well defined. Another limiting factor is the long lines for payment at a manual cash register/point of sale terminal.

The present invention overcomes the above and other limitations of the prior art by enabling one or more customers to communicate their order in conjunction with their user/customer preferences to the selected vendor for dynamic use or for storage and use at selected times in conjunction with a vendor server/vendor databases. The communication is enabled from a stationary device located remotely or at the vendor establishment, such a ordering terminal. Alternately, the communication is enabled by a mobile device such as cellular telephone, PDA, lap top computer and other devices.

The vendor establishment recognizes the customer profile/preferences and prepares the order manually or automatically in accordance with the user/customers preferences. The order, when received is staged for automatic execution by the mass IBA/ICA. The mass IBA/ICA is enabled for storage of a large number of carousels of the beverage/food such that the selected carousel is inserted into the food preparation mechanism and the carousel is spun to deliver the individual beverage/food package/pod for customized preparation of the selected beverage/food item in accordance with the selected user's/customer's profile preferences. The orders may as an example, are identified by the mobile device number/ID or by a customer ID. The order upon execution is automatically communicated by wired or wireless means and charged to the mobile device user and his mobile device account, including charging to the user's credit card or by other payment methods including in conjunction with a cash register or an intelligent point of sale terminal and payment in person. The user and or the vendor is enabled to store pertinent information in a secure escrow server or other servers for selected access by the vendor, the customer and or the customer's designees such as health care professionals based on pre set rules or permissions; for one or more purposes including personal health management and in the case of the vendor for marketing, promotions and new product development.

In another embodiment of the present invention, programmable RF ID Tags, smart cards and other forms may be provided to the customer/user for in store use such that the customer specific information contained therein is enabled for communication with an IBA/ICA for customized preparation, dispensation and payment for the items ordered.

In another embodiment of the present invention one or more similar and or dissimilar intelligent beverage appliances and intelligent culinary appliances are networked [wired and or wireless communication] in a fast food/fast beverage retail establishment for the purpose of providing variety, choice, personalization and faster service to customers by manual or automatic means wherein the selection and sale of the beverage/food item is via a sales person or by automatic means via one or more in store stationary/mobile devices or via the customer's mobile device/stationary device; and including payment by via the mobile device and an intelligent point of sale terminal.

In another embodiment of the present invention, the customers such in the case of a fast food restaurant are enabled to command, control, place an order, pay for an order and schedule pick up/delivery using a mobile device such as a PDA/cellular telephone.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A machine for creating and dispensing beverages, the machine comprising:

a housing that stores cartridges that are used to create a beverage;

a plurality of cartridges containing beverage ingredients, wherein each cartridge is replaceable and may be placed in the housing;

a preparation unit, wherein a beverage is prepared from the beverage ingredients;

a dispenser, wherein the dispenser releases the beverage liquid;

a touch screen display;

a plurality of icons, wherein the icons are associated with a specific type of beverage or action related to ordering or dispensing the beverage;

a user interface (UI) component, wherein the UI component allows a user to order a beverage, and wherein the beverage is created based on a specific order from a customer;

a processor;

a memory communicatively coupled with the processor;

a storage component communicatively coupled with the memory;

a wireless transmit and receive communication component;

a machine identification (ID); and a plurality of RFID tags, wherein the processor on the machine is configured to access RFID information from one or more RFID tags, wherein the one or more RFID tags are configured with beverage profile information, wherein one more tags are configured for read-only access of beverage related information and one or more tags are configured for read-and-write access of beverage related information, wherein the processor accesses RFID tag information, and wherein the machine sends to a network server separate from the machine beverage or other information accessed from the one or more RFID tags.

2. The machine of claim 1, further comprising a server, wherein the server tracks data related to the machine including one or more of order data, purchase data, time of day, and customer data.

3. The machine of claim 1, wherein the machine downloads software updates from a server.

4. The machine of claim 1, further comprising a non-transitory computer readable storage medium or software program that enables a user to access beverage information or place an order using the mobile device, wherein the mobile device sends the order to the machine.

5. The machine of claim 4, wherein the machine is further in communication with a mobile device, the mobile device storing in a memory of the mobile device a profile of a customer, wherein the profile includes payment information, wherein the software program allows for an option to pay for a beverage using stored credit card data, wherein the mobile device sends the payment information to a server, wherein the server communicates a valid payment to the machine, and wherein the machine dispenses the beverage in accordance with an order placed on said mobile device.

6. The machine of claim 1, further comprising a mobile device, wherein the mobile device is associated with a customer profile stored on a vendor's server.

7. The machine of claim 1, wherein said one or more RFID tags are may be placed on the beverage appliance or mobile device or other beverage related item.

8. The machine of claim 1, wherein the machine accepts a payment using a credit card.

9. The machine of claim 1, wherein the machine accepts a payment using a mobile phone.

10. The machine of claim 1, wherein the machine collects a photo of a customer and associates said photo with an order.

11. The machine of claim 1, wherein the machine is configured to mix and match flavors based on a customized order.

12. The machine of claim 1, wherein the one or more RFID tags are associated with ingredient cartridges, and wherein the processor accesses the one or more RFID tag data and sends the data to the network server.

13. The machine of claim 1, wherein the machine is configured for dispensing various drinks including one or more of lemonade, ice tea, iced coffee, fruit juices, colas, or other cold drinks or combinations thereof.

14. The machine of claim 1, wherein the machine is configured to dispense hot beverages including one or more of coffee, tea, and hot chocolate or combinations thereof.

15. A system for creating and dispensing beverages, comprising:

a housing that stores cartridges that are used to create a beverage;

a plurality of cartridges containing beverage ingredients, wherein each cartridge is replaceable and may be placed in the housing;

a preparation unit, wherein a beverage is prepared from the beverage ingredients;

a dispenser, wherein the dispenser releases the beverage liquid;

a touch screen display;

a plurality of icons, wherein the icons are associated with a specific type of beverage or action related to ordering or dispensing the beverage;

a user interface (UI) component, wherein the UI component allows a user to order a beverage, and wherein the beverage is created based on a specific order from a customer;

a processor;

a memory communicatively coupled with the processor;

a storage component communicatively coupled with the memory;

a wireless transmit and receive communication component;

a machine identification (ID); and a plurality of RFID tags, wherein the processor is configured to access RFID information from one or more RFID tags, wherein the one or more RFID tags are configured with beverage profile information, wherein one more tags are configured for read-only access of beverage related information and one or more tags are configured for read-and-write access of beverage related information, wherein the processor accesses RFID tag information, and wherein the system sends to a network server separate from the system or other information accessed from the one or more RFID tags.

16. The system of claim 15, further comprising a point of sale (POS) system, wherein said point of sale system accepts an order from the mobile device.

17. The system of claim 15, wherein delivery and payment of the beverage order is based on a user defined profile.

18. The system of claim 15, wherein the requested item is a hot or cold beverage or coffee or tea beverage.

19. The system of claim 15, wherein the mobile device communicates with the POS system using RFID.

20. The system of claim 15, wherein the beverage appliance is a coffee machine.

21. The system of claim 15, wherein delivery and payment of a beverage order is according to the personal preferences of the user.

22. The system of claim 15, wherein a user may provide a picture to the vendor.

23. The system of claim 15, wherein a server stores preferences of a user and wherein the preferences relate to food or beverage.

24. The system of claim 15, wherein a server receives a request for refills of packages or pods from a mobile device.

25. The system of claim 15, wherein a server includes a database and wherein the database includes profiles for multiple users including preferences related to food or beverage items.

26. The system of claim 15, the system being configured for automation of preparation of beverage drinks, wherein a user may request a beverage item using a mobile device, wherein the request for a beverage item is sent to a server, and wherein a user is automatically charged the amount of the item requested based on a stored payment profile.

27. The system of claim 15, wherein a server maintains store level information including one or more of the following of individual beverage preferences, consumption patterns, and tracking of consumption of individual beverage items ordered at a vendor location.

28. The system of claim 15, wherein the system is configured for dispensing various drinks including one or more of lemonade, ice tea, iced coffee, fruit juices, colas, or other cold drinks or combinations thereof.

29. The system of claim 15, wherein the system is configured to dispense hot beverages including one or more of coffee, tea, and hot chocolate or combinations thereof.

30. The system of claim 15, wherein a program allows an individual to request a beverage, and wherein a program is executed by a processor on a mobile device, and wherein the program utilizes a touch screen display of the mobile device for interaction with a user; and a server, wherein the mobile device sends a data request comprising beverage related information to the server.

31. The system of claim 15, wherein ordering and payment of the selected beverage or food item may be conducted by a user or a customer using the mobile device.

32. A machine for creating and dispensing beverages, the machine comprising:
   a housing that stores pods that are used to create a beverage;
   a plurality of pods containing beverage ingredients, wherein each pod is replaceable and may be placed in the housing;
   a preparation unit, wherein a beverage is prepared from the beverage ingredients;
   a dispenser, wherein the dispenser releases the beverage liquid;
   a touch screen display;
   a plurality of icons, wherein the icons are associated with a specific type of beverage or action related to ordering or dispensing the beverage;
   a user interface (UI) component, wherein the UI component allows a user to order a beverage, and wherein the beverage is created based on a specific order from a customer;
   a processor;
   a memory communicatively coupled with the processor;
   a storage component communicatively coupled with the memory;
   a wireless transmit and receive communication component;
   a machine identification (ID); and
   a plurality of RFID tags, wherein the processor on the machine is configured to access RFID information from one or more RFID taus, wherein the one or more RFID tags are configured with beverage profile information, wherein one more tags are configured for read-only access of beverage related information and one or more tags are configured for read-and-write access of beverage related information, wherein the processor accesses RFID tag information, and wherein the machine sends to a network server separate from the machine beverage or other information accessed from the one or more RFID tags.

33. The machine of claim 32, wherein the machine is configured for use in a retail location, restaurant, home location, office location, or combination thereof.

34. The machine of claim 32, wherein the machine dispenses beverages in accordance with an individual's personalized preferences.

35. The machine of claim 34, wherein the personalized preferences of a plurality of individuals is stored for evaluation and analysis.

36. The machine of claim 32, wherein the machine is configured for dispensing various drinks including one or more of lemonade, ice tea, iced coffee, fruit juices, colas, or other cold drinks or combinations thereof.

37. The machine of claim 32, wherein the machine is configured to dispense hot beverages including one or more of coffee, tea, and hot chocolate or combinations thereof.

38. The machine of claim 32, wherein the machine is configured with one or more identifiers including an IP address.

39. The machine of claim 32, wherein the machine is programmable for initiating an action including preparation of coffee at a specified time in accordance with the user selected/set preferences.

40. The machine of claim 39, wherein the beverage appliance accepts an order from a mobile device.

41. The machine of claim 39, wherein the beverage appliance prepares a beverage based on an input from a separate intelligent appliance.

42. The machine of claim 39, wherein the beverage appliance prepares a beverage based on a separate intelligent appliances including an intelligent alarm clock.

43. A system for creating and dispensing beverages, comprising:
   a housing that stores pods that are used to create a beverage;
   a plurality of pods containing beverage ingredients, wherein each pod is replaceable and may be placed in the housing;
   a preparation unit, wherein a beverage is prepared from the beverage ingredients;
   a dispenser, wherein the dispenser releases the beverage liquid;
   a touch screen display;
   a plurality of icons, wherein the icons are associated with a specific type of beverage or action related to ordering or dispensing the beverage;
   a user interface (UI) component, wherein the UI component allows a user to order a beverage, and wherein the beverage is created based on a specific order from a customer;
   a processor;
   a memory communicatively coupled with the processor;
   a storage component communicatively coupled with the memory;
   a wireless transmit and receive communication component;
   a machine identification (ID); and
   a plurality of RFID tags, wherein the processor is configured to access RFID information from one or more RFID tags, wherein the one or more RFID tags are configured with beverage profile information, wherein one more tags are configured for read-only access of beverage related information and one or more tags are configured for read-and-write access of beverage related information, wherein the processor accesses RFID tag information, and wherein the system sends to a network server separate from the system or other information accessed from the one or more RFID tags.

44. The system of claim 43, further comprising a point of sale (POS) system, wherein said point of sale system accepts an order from the mobile device.

45. The system of claim 43, wherein delivery and payment of the beverage order is based on a user defined profile.

46. The system of claim 43, wherein the requested item is a hot or cold beverage or coffee or tea beverage.

47. The system of claim 43, wherein the mobile device communicates with the POS system using RFID.

48. The system of claim 43, wherein the beverage appliance is a coffee machine.

49. The system of claim 43, wherein delivery and payment of a beverage order is according to the personal preferences of the user.

50. The system of claim 43, wherein a user may provide a picture to the vendor.

51. The system of claim 43, wherein a server stores preferences of a user and wherein the preferences relate to food or beverage.

52. The system of claim 43, wherein a server receives a request for refills of packages or pods from a mobile device.

53. The system of claim 43, wherein a server includes a database and wherein the database includes profiles for multiple users including preferences related to food or beverage items.

54. The system of claim 43, the system being configured for automation of preparation of beverage drinks, wherein a user may request a beverage item using a mobile device, wherein the request for a beverage item is sent to a server, and wherein a user is automatically charged the amount of the item requested based on a stored payment profile.

55. The system of claim 43, wherein a server maintains store level information including one or more of the following of individual beverage preferences, consumption patterns, and tracking of consumption of individual beverage items ordered at a vendor location.

56. The system of claim 43, wherein the machine is configured for dispensing various drinks including one or more of lemonade, ice tea, iced coffee, fruit juices, colas, or other cold drinks or combinations thereof.

57. The system of claim 43, wherein the machine is configured to dispense hot beverages including one or more of coffee, tea, and hot chocolate or combinations thereof.

58. The system of claim 43, wherein a program allows an individual to request a beverage, and wherein a program is executed by a processor on a mobile device, and wherein the program utilizes a touch screen display of the mobile device for interaction with a user; and a server, wherein the mobile device sends a data request comprising beverage related information to the server.

59. The system of claim 43, wherein ordering and payment of the selected beverage or food item is conducted by a user or a customer using the mobile device.

\* \* \* \* \*